United States Patent
Bernardon (10) Patent No.: US 7,723,967 B2
(45) Date of Patent: May 25, 2010

(54) STEP-UP CONVERTER HAVING AN IMPROVED DYNAMIC RESPONSE

(75) Inventor: Derek Bernardon, Villach (AT)

(73) Assignee: Infineon Technologies AG, Munich (DE)

( * ) Notice: Subject to any disclaimer, the term of this patent is extended or adjusted under 35 U.S.C. 154(b) by 805 days.

(21) Appl. No.: 11/266,010

(22) Filed: Nov. 3, 2005

(65) Prior Publication Data

US 2006/0113976 A1 Jun. 1, 2006

(30) Foreign Application Priority Data

Nov. 3, 2004 (DE) .................. 10 2004 053 144

(51) Int. Cl.
G05F 1/24 (2006.01)
G05F 1/00 (2006.01)
(52) U.S. Cl. .................. 323/266; 323/259; 323/285; 323/300; 323/344
(58) Field of Classification Search ......... 323/282–288, 323/280, 259, 299, 266, 300, 328, 344
See application file for complete search history.

(56) References Cited

U.S. PATENT DOCUMENTS

| | | | |
|---|---|---|---|
| 4,536,700 A | | 8/1985 | Bello et al. |
| 4,546,421 A | | 10/1985 | Bello et al. |
| 4,630,187 A | | 12/1986 | Henze |
| 4,652,808 A | * | 3/1987 | Mostyn et al. ............. 323/222 |
| 5,479,090 A | * | 12/1995 | Schultz ....................... 323/284 |
| 5,689,176 A | * | 11/1997 | Deloy ......................... 323/222 |
| 5,764,038 A | * | 6/1998 | Bloeckl ....................... 323/222 |
| 5,949,229 A | * | 9/1999 | Choi et al. .................. 323/320 |
| 6,034,513 A | * | 3/2000 | Farrington et al. .......... 323/222 |
| 6,037,755 A | * | 3/2000 | Mao et al. .................. 323/222 |
| 6,066,943 A | * | 5/2000 | Hastings et al. ............ 323/285 |
| 6,069,470 A | | 5/2000 | Feldtkeller |
| 6,215,287 B1 | * | 4/2001 | Matsushiro et al. ......... 323/222 |
| 6,285,174 B1 | * | 9/2001 | Suzuki ....................... 323/288 |

(Continued)

FOREIGN PATENT DOCUMENTS

DE 197 25 842 A1 1/1999

(Continued)

OTHER PUBLICATIONS

Tarter, R., "Solid-State Power Conversion Handbook", 1993, Wiley & Sons, pp. 351-352, (2 pages).

(Continued)

*Primary Examiner*—Jessica Han
*Assistant Examiner*—Emily Pham
(74) *Attorney, Agent, or Firm*—Maginot, Moore & Beck (57) ABSTRACT

A step-up converter includes input and output terminals, step-up conversion circuitry, a first feedback path and a drive circuit. The input terminals are configured to receive an input DC voltage and the output terminals configured to provide an output DC voltage. The step-up conversion circuitry is coupled between the input terminals and the output terminals and includes a switching element. The first feedback path has a regulator arrangement configured to provide a regulating signal which is dependent on the output voltage. The drive circuit is configured to provide a pulse-width-modulated drive signal for the switching element and is supplied with the regulating signal, wherein the drive circuit is configured to generate the drive signal in a manner that corresponds to the input voltage.

6 Claims, 5 Drawing Sheets

U.S. PATENT DOCUMENTS

| | | | |
|---|---|---|---|
| 6,307,361 B1 * | 10/2001 | Yaakov et al. | 323/288 |
| 6,448,745 B1 * | 9/2002 | Killat | 323/222 |
| 6,590,442 B2 * | 7/2003 | Byeon et al. | 327/537 |
| 6,744,241 B2 * | 6/2004 | Feldtkeller | 323/207 |
| 6,909,268 B2 | 6/2005 | Taghizadeh-Kaschani | |
| 6,992,468 B2 * | 1/2006 | Kranz | 323/283 |
| 7,042,743 B2 * | 5/2006 | Pidutti et al. | 363/89 |
| 2003/0111989 A1 * | 6/2003 | Kranz | 323/283 |
| 2003/0227279 A1 * | 12/2003 | Feldtkeller | 323/222 |
| 2004/0012376 A1 | 1/2004 | Taghizadeh-Kaschani | |

FOREIGN PATENT DOCUMENTS

DE     100 43 482 A1     3/2002

OTHER PUBLICATIONS

"Understanding Boost Power Stages in Switchmode Power Supplies", SVLA061, Mar. 1999, Texas Instruments, Inc., pp. 1-28, (28 pages).

\* cited by examiner

STEP-UP CONVERTER HAVING AN IMPROVED DYNAMIC RESPONSE

The present invention relates to a step-up converter (boost converter).

Figure 1:
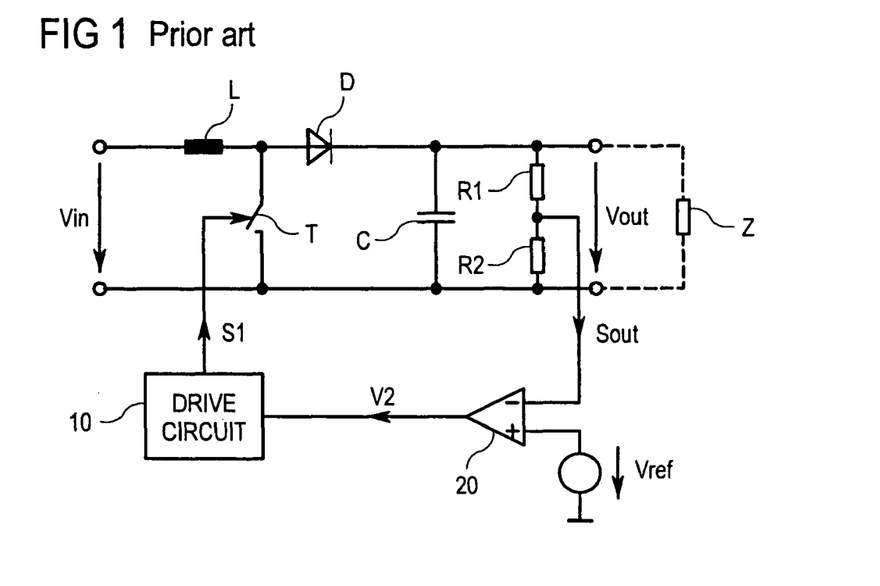
FIG. 1 shows a step-up converter in accordance with the prior art.

Step-up converters are used, in a sufficiently known manner, to convert an input voltage into an output voltage which is greater than the input voltage. FIG. 1 shows the basic structure of such a step-up converter, said basic structure being described, for example, in Tarter, R.: "Solid-State Power Conversion Handbook", 1993, Wiley & Sons, ISBN 0-471-57243-8, page 352, or in "Understanding Boost Power Stages in Switchmode Power Supplies" SVLA061, March 1999, Tex. Instruments, Inc. The step-up converter has input terminals for applying an input voltage Vin and output terminals for providing an output voltage Vout for a load which can be connected to the output terminals (shown using dashed lines). A series circuit comprising an inductive storage element L and a switching element T which is driven by a drive circuit 1' is connected between the input terminals. A series circuit comprising a rectifier element D, for example a diode, and an output capacitor C, across which the output voltage Vout can be tapped off, is connected in parallel with the load path of the switch.

The switching element T is driven using a pulse-width-modulated drive signal S1 whose duty ratio (duty cycle) is dependent on a feedback regulating signal V2. In this case, the duty ratio denotes the ratio between a switched-on duration of the switching element and the duration of a drive period of the switching element, said drive period corresponding to the sum of the switched-on duration and switched-off duration.

A regulating amplifier or error amplifier is used to generate this regulating signal V2 in a manner dependent on the output voltage Vout, the value of the regulating signal V2 increasing, for example, if a fall in the output voltage Vout indicates an increased power consumption of the load Z. In the event of the signal V2 increasing in this manner, the power consumption is increased in order to counteract a further fall in the output voltage Vout. In this case, the power consumption can be increased by increasing the duty ratio.

Figure 2:
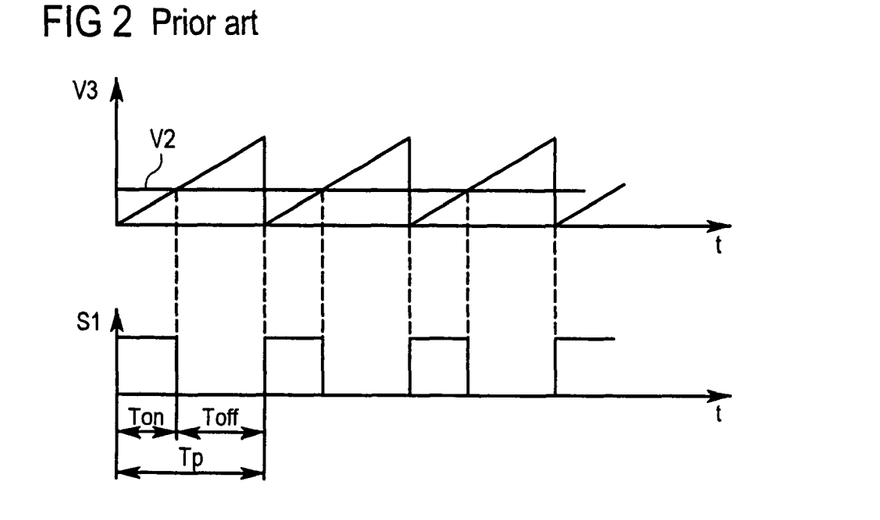
FIG. 2 shows temporal profiles of a ramp signal, of a regulating signal and of a drive signal (derived therefrom) for a switch of a step-up converter in accordance with the prior art.

Referring to FIG. 2, in order to generate the pulse-width-modulated drive signal S1, a periodic ramp-shaped signal or sawtooth signal V3 is generated, for example, in the drive circuit, said ramp-shaped or sawtooth signal being compared with the regulating signal V2. A switching-on level (a high level in FIG. 2) for the drive signal S1 is respectively generated, for example, at the beginning of a period of the ramp signal V3 in order to switch on the switch T. The switch T is respectively switched off when the ramp signal reaches the regulating signal V2. If the regulating signal V2 increases as the power consumption of the load increases, the switched-on duration Ton is extended. The switched-on duration corresponds to the period of time between switching-on and the point in time at which the ramp signal V3 reaches the regulating signal V2. In FIG. 2, Tp is used to denote the period duration of the ramp signal V3, and Toff is used to denote the switched-off duration of the switch. The following applies to the duty cycle D:

$$D = Ton/(Ton+Toff) = Ton/Tp \quad (1)$$

In addition to the duty cycle, the value of the input voltage Vin has a decisive influence on the value of the output voltage. This input voltage may be subject to considerable fluctuations depending on the application. In order to achieve a prescribed power consumption level, the switched-on duration Ton must increase as the input voltage Vin falls. It follows from this that the input voltage Vin considerably affects the (dynamic) regulating response of the arrangement explained above since, as the input voltage becomes smaller, greater changes in the switched-on duration are necessary in order to achieve a particular change in the power consumption, and the regulating response thus deteriorates as the input voltage becomes smaller.

In order to solve this problem, it is known practice, in the case of so-called current-mode step-up converters, to use a current measurement signal as the ramp signal, said current measurement signal being proportional to a current through the switch during the switched-on duration. A current-mode step-up converter of this type is described, for example, in DE 100 43 482 A1.

In addition, DE 197 25 842 A1 discloses a current-mode step-up converter which is used in a PFC (Power Factor Correction) circuit and in which the regulating signal which is dependent on the output voltage is multiplied by a signal which is dependent on the input voltage, which is necessary given the particular regulating conditions in PFC circuits which are supplied with an AC voltage as the input voltage.

It is an aim of the present invention to provide a step-up converter having an improved regulating response in the case of a changing input voltage and to provide a step-up converter having an improved regulating response in the case of an output voltage which changes suddenly. This aim is achieved by means of step-up converters having the features of claims 1 and 5. The subclaims relate to advantageous refinements of the invention.

The inventive step-up converter has input terminals for applying an input DC voltage and output terminals for providing an output DC voltage, and an inductive storage element, a switching element and a rectifier arrangement which are connected in a step-up converter configuration. In addition, the step-up converter comprises a first feedback path having a regulator arrangement for providing a regulating signal which is dependent on the output voltage and a drive circuit which is intended to provide a pulse-width-modulated drive signal for the switching element and is supplied with the regulating signal.

In order to improve the regulating response in the case of a changing input voltage, provision is made in this case for the drive circuit to be supplied with an input signal which is dependent on the input voltage and for the drive circuit to be designed to generate the drive signal in a manner dependent on this input signal. This direct influence of the input voltage on the generation of the pulse-width-modulated regulating signal makes it possible to eliminate the dependence of the dynamic regulating response on the input voltage, as will be explained below.

The drive circuit may have a ramp signal generation circuit which is supplied with the input signal and which generates a periodic ramp signal having a gradient which is dependent on the input signal. In this case, a comparator arrangement generates the drive signal in a manner dependent on a comparison of the ramp signal with the regulating signal. The influence of the input signal on the gradient is selected in a manner dependent on the way in which the drive signal is generated. In one embodiment in which the drive signal is generated in such a manner that it respectively assumes a switching-on level when a period of the ramp-shaped signal begins and respectively assumes a switching-off level when the ramp signal reaches the regulating signal, the gradient of the ramp-shaped signal increases as the input voltage increases. In the case of an increasing input voltage in conjunction with an unchanged regulating signal, this automatically reduces the switched-on duration in order to keep the power consumption constant. Without the input voltage being directly injected into the drive circuit in this manner (which may also be referred to as feedforward), the output voltage would first of all increase, in the case of an increasing input voltage and a duty ratio which is initially unchanged, until the switched-on duration was regulated back using the regulating signal.

In order to improve the regulating response in the case of an output voltage which changes suddenly, provision is preferably made of a second feedback path having a sudden load change detector which is designed to detect a sudden change in the output voltage and to provide a sudden load change signal which is dependent on such a detection and is supplied to the drive circuit for generating the pulse-width-modulated drive signal.

Such a second feedback path can be provided in conjunction with the direct injection (explained above) of the input voltage or input signal into the drive circuit or else independently thereof.

In the case of a sudden change in the output voltage, the sudden load change signal can be used, while circumventing the first feedback path, to rapidly change the switched-on duration in order to rapidly compensate for sudden load changes of this type.

The sudden load change signal is preferably supplied to the ramp signal generation circuit in order, for example in the case of a sudden increase in the output voltage, to increase the gradient of the ramp signal and, in the case of a sudden fall in the output voltage, to reduce the gradient of the ramp signal. The sudden load change signal is preferably formed in such a manner that it respectively affects the generation of the drive signal only for a prescribed period of time after a sudden load change has been detected.

The present invention is explained in more detail below with reference to figures.

In the figures, unless specified otherwise, identical reference symbols denote identical circuit components and signals having the same meaning.

Figure 3:
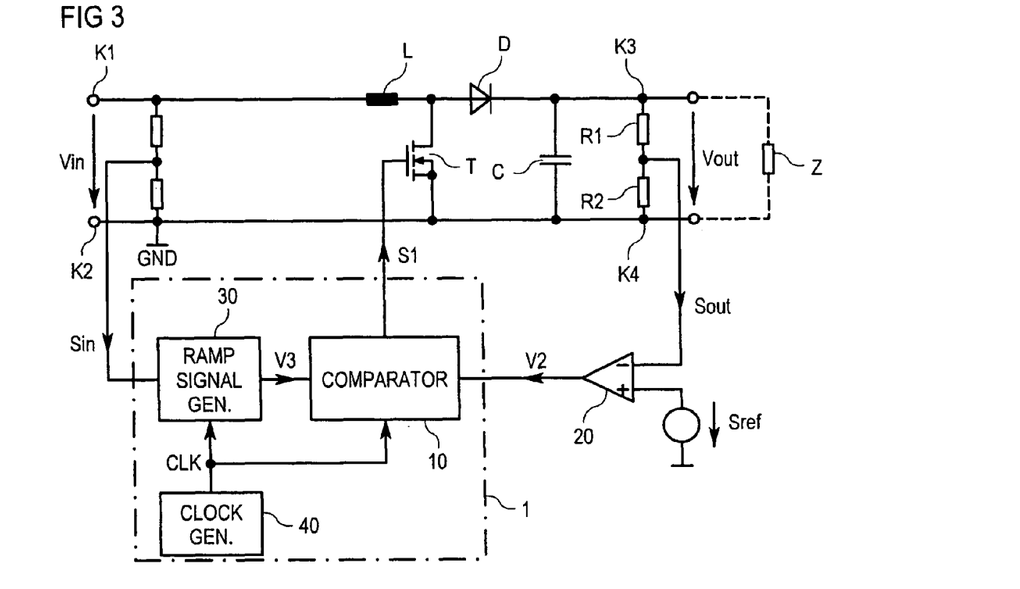
FIG. 3 shows a first exemplary embodiment of an inventive step-up converter having a drive circuit which is supplied with an input signal which is dependent on an input voltage.

The inventive step-up converter shown in FIG. 3 has input terminals K1, K2 for applying an input voltage Vin, output terminals K3, K4 for providing a regulated output voltage Vout, and an inductive storage element L, a switching element T and a rectifier arrangement D, C. In the example, the rectifier arrangement has a diode D and a capacitive storage element C, in particular a capacitor. The inductive storage element L, the switching element T and the rectifier arrangement D, C are connected in a step-up converter configuration. To this end, the inductive storage element L, which is in the form of a storage inductor, for example, and the switching element T are connected in series between the input terminals K1, K2. A series circuit comprising the diode D and the capacitor C is connected in parallel with the switching element T which is in the form of a MOSFET in the example. The output voltage Vout can be tapped off across the capacitor C.

In order to drive the switching element T using a pulse-width-modulated drive signal S1, there is a drive circuit 1 which is supplied with a regulating signal V2 which is dependent on an output voltage Vout. This regulating signal is available at the output of a feedback path which has a regulator arrangement having a regulating amplifier 20. This regulating amplifier 20 is supplied with an output signal which is dependent on the output voltage Vout and is generated by a voltage divider R1, R2 which is connected between the output terminals K3, K4. The regulating amplifier 20 compares the output signal Sout with a reference signal Sref which defines the desired value of the output voltage Vout taking into account the divider ratio of the voltage divider. The regulating amplifier 20 generates the regulating signal V2 in a manner dependent on the difference between the output signal Sout and the reference signal Sref. In a sufficiently known manner, this regulating amplifier 20 may have a proportional regulating response (P regulator), an integral regulating response (I regulator) or a proportional/integral regulating response (PI regulator).

In the example, the drive signal generation circuit 1 has a ramp signal generation circuit 30, a clock generator 40 and a comparator arrangement 10. The ramp signal generation circuit 30 is designed to generate a ramp-shaped signal V3 in time with a clock signal CLK which is generated by the clock generator 40, said ramp-shaped signal rising periodically starting from an initial value and being reset to the initial value again before a next period begins. In this case, the gradient of the individual ramp-shaped sections (which are temporally successive) of this ramp signal V3 is dependent on the input voltage Vin. To this end, the ramp signal generation circuit 30 is supplied with an input signal Sin which is generated from the input voltage Vin using a voltage divider R3, R4 which is connected between the input terminals K1, K2.

The gradient of the individual ramp-shaped sections of the ramp signal V3 is preferably proportional to the input signal Sin and is thus proportional to the input voltage Vin.

The method of operation of the drive circuit shown in FIG. 1 is explained below with reference to FIG. 4 whose upper part shows exemplary temporal profiles of the ramp signal V3 and of the regulating signal V2 and whose lower part shows the resulting temporal profile of the drive signal S1.

In the case of the drive circuit 1 shown in FIG. 3, the comparator arrangement 10 is supplied with both the clock signal CLK and the ramp signal V3. The comparator arrangement 10 is designed to respectively generate a switching-on level (a high level in the example) for the drive signal S1 when a period of the ramp signal V3 begins. This synchronization between the beginning of a period of the ramp-shaped signal V3 and the generation of a switching-on level for the drive signal S1 is effected using the clock signal which is supplied to both the ramp signal generation circuit 30 and the comparator arrangement 10.

A switching-off level for the drive signal S1 (a low level in the example) is respectively generated again when the ramp signal V3 has risen to the value of the regulating signal V2. The switched-on duration Ton denotes the period of time between the generation of the switching-on level and the subsequent generation of the switching-off level, the switched-off duration Toff denotes the period of time between the generation of the switching-off level and the renewed generation of a switching-on level, and the period duration Tp of the ramp-shaped signal V3 denotes the sum of the switched-on duration Ton and switched-off duration Toff. As is immediately apparent from the temporal profiles shown in FIG. 4, the switched-on duration Ton increases as the value of the regulating signal V2 increases, with an unchanged gradient of the ramp-shaped signal V3. In this case, the regulating signal V2 is generated by the regulating arrangement 20 in such a manner that it increases as the power required by a load Z (which is connected to the output terminals K3, K4 and is depicted using dashed lines in FIG. 3) increases. This means that, as the power required by the load Z increases, the switched-on duration is increased and thus the power consumption of the step-up converter is increased.

Figure 4:
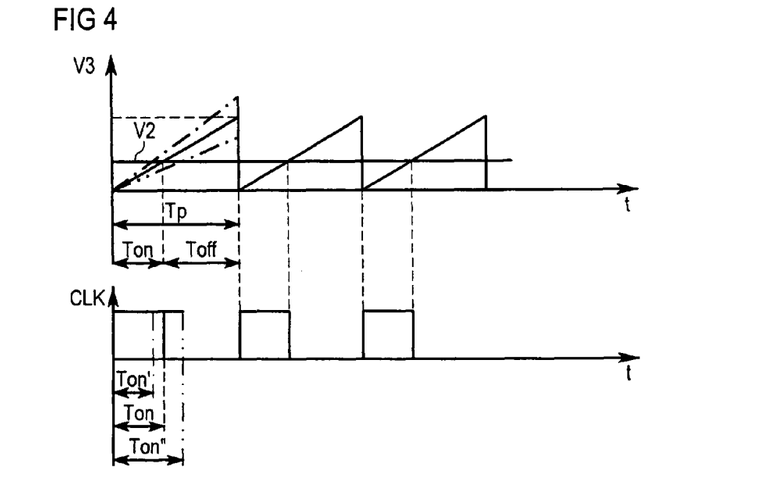
FIG. 4 shows, by way of example, temporal profiles of a ramp signal which is generated in the inventive step-up converter shown in FIG. 3, of a regulating signal and of a drive signal (derived therefrom) for a switch in the step-up converter.

The effects of setting the gradient of the ramp-shaped signal V3 in a manner dependent on the input voltage Vin are illustrated in FIG. 4 for one period of the ramp-shaped signal V3. If the input voltage Vin increases, the gradient of the ramp-shaped signal V3 increases, as is shown for the ramp-shaped rise shown using dash-dotted lines. If the regulating signal V2 remains the same, this steeper rise directly results in a shorter switched-on duration Ton' in order to take into account the fact that, in the case of an increased input voltage Vin, even a short switched-on duration is sufficient to achieve a given power consumption. By contrast, if the input voltage Vin falls, the gradient of the ramp-shaped rise is reduced, which is illustrated in FIG. 4 by the further dash-dotted ramp-shaped profile. This gentler ramp-shaped profile leads to an extended switched-on duration Ton" in order to take into account the fact that, in the case of a reduced input voltage Vin, a longer switched-on duration is needed to achieve a given power consumption.

Figure 5:
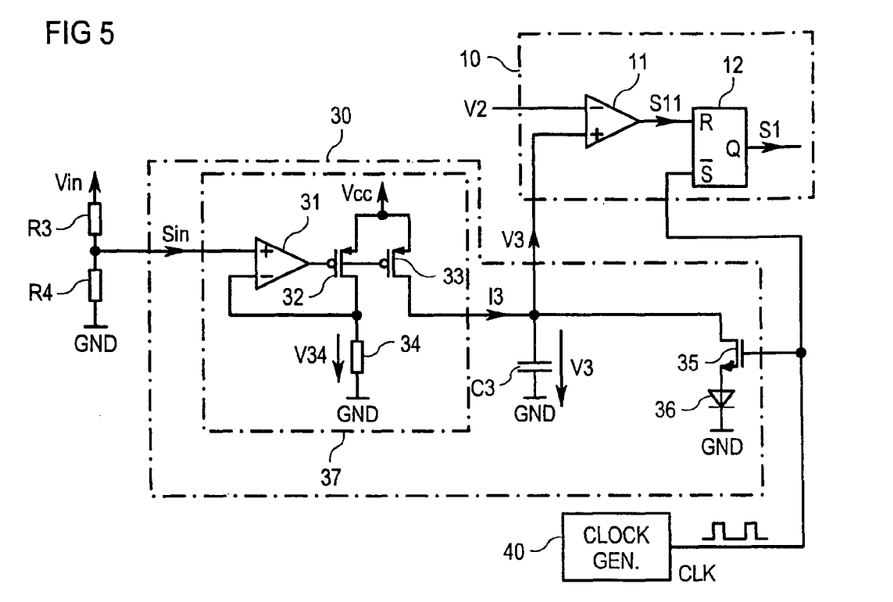
FIG. 5 illustrates an exemplary implementation of circuitry for a ramp signal generation circuit and a comparator arrangement in an inventive step-up converter.

FIG. 5 shows an exemplary implementation of circuitry for the ramp signal generation circuit 30 and the comparator arrangement 10.

In the example, the ramp signal generation circuit 30 has a voltage-controlled current source 37 which is supplied with the input signal Sin as a control signal. In this case, the input signal is a voltage which is proportional to the input voltage Vin using the divider ratio of the voltage divider R3, R4. The voltage-controlled current source 37 provides a current I3 which is dependent on this input signal Sin. A capacitive storage element C3 is connected to the voltage-controlled current source 37, a switch arrangement comprising a MOS transistor 35 and a diode 36 being connected in parallel with said capacitive storage element. The switch arrangement 35 is driven according to the clock signal CLK in such a manner that the capacitive storage element C3 is respectively discharged for a prescribed period of time during a period duration of the clock signal CLK and the capacitive storage element C3 is charged during the remaining period of time using the current from the voltage-controlled current source 37. The clock signal CLK is, for example, a pulse-width-modulated signal having a duty ratio of 10%, with the result that the capacitor C3 is discharged according to the clock signal during a period of time which corresponds to 10% of the period duration and is charged during the remaining period of time using the current I3 from the voltage-controlled current source 37. This duty ratio of the clock signal CLK is selected in such a manner that the switched-on duration of the transistor 35 is respectively sufficient to fully discharge the capacitor C3 to an initial value, for example reference-ground potential GND. During the charging duration of the capacitor C3, the voltage V3 (which forms the ramp signal) across the capacitor increases in proportion to the current I3 and thus in proportion to the input voltage Vin.

In the example, the voltage-controlled current source 37 has a differential amplifier 31 and two MOS transistors (p-conducting MOS transistors 32, 33 in the example) which are driven by the differential amplifier 31. In this case, one of the transistors 32 is used as a regulating transistor and is connected in series with a resistor 34 between a supply potential Vcc and reference-ground potential GND. The noninverting input of the differential amplifier 31 is supplied with the input signal Sin and the inverting input of said differential amplifier is supplied with a voltage V34 across the resistor 34. The differential amplifier 31 drives the MOS transistor 32 in such a manner that the voltage across the resistor 34 corresponds to the input signal Sin. A current flowing through this resistor 34 is then proportional to the input signal Sin and to the input voltage Vin. The output current I3 (which flows through the further MOS transistor 33) from the current source 37 is likewise proportional to the input signal Sin, it being possible for the currents through the two transistors 32, 33 to differ if different area ratios are selected for the transistors 32, 33. In the sense of minimizing the power loss, the transistor 32 is preferably selected to be smaller than the transistor 33 in this case.

The comparator arrangement 10 has a comparator 11 whose inverting input is supplied with the regulating signal V2 and whose noninverting input is supplied with the ramp signal V3. An output signal S11 from this comparator 11 drives the reset input R of an RS flip-flop 12 whose set input is supplied with the clock signal CLK. In this case, this flip-flop 12 is designed in such a manner that it respectively generates a high level for the drive signal S1 after a falling edge of the clock signal CLK, that is to say respectively when discharging of the capacitor C3 via the transistor 35 has ended. The flip-flop 12 is respectively reset upon a rising edge of the comparator signal S11, that is to say when the ramp signal V3 exceeds the regulating signal V2.

Figure 6:
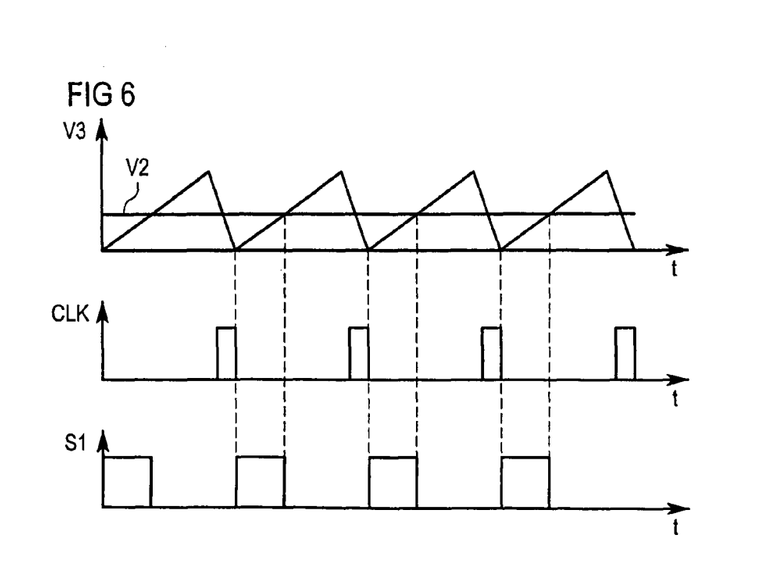
FIG. 6 shows, by way of example, temporal profiles of selected signals of the ramp signal generation circuit and of the comparator arrangement shown in FIG. 5.

FIG. 6 shows the temporal profiles of the clock signal CLK, of the ramp signal V3 and of the resulting drive signal S1 for the arrangement shown in FIG. 5.

Figure 7:
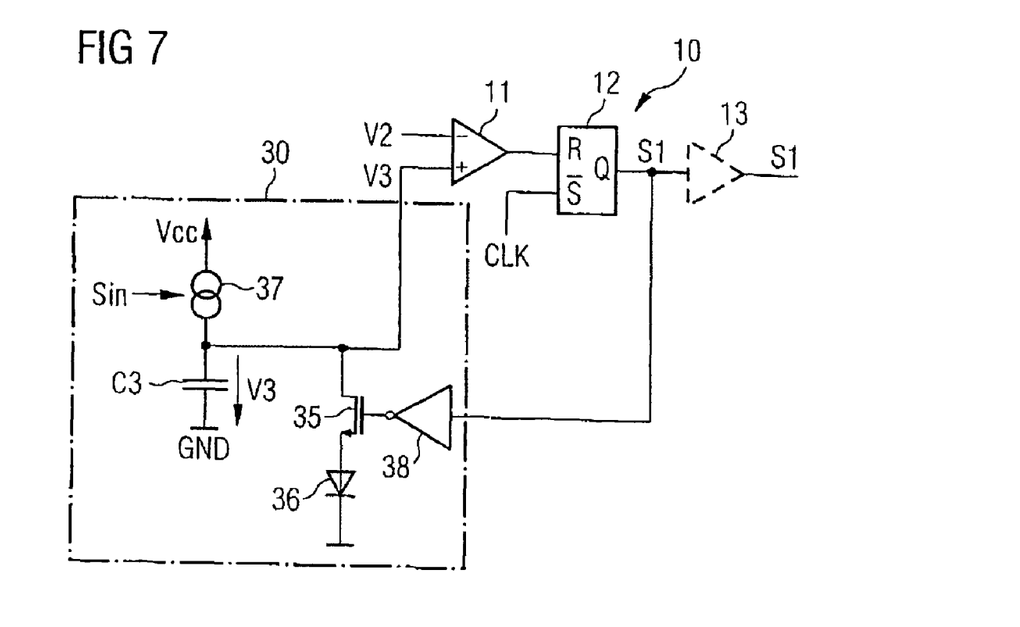
FIG. 7 shows a modification of the ramp signal generation circuit shown in FIG. 5 and a modification of the comparator arrangement shown in FIG. 5.

FIG. 7 shows a modification of the ramp signal generation circuit 30 and of the comparator arrangement 10 shown in FIG. 5. In this case, the capacitor C3 of the ramp signal generation circuit is respectively discharged in a manner dependent on the drive signal S1 during the switched-off duration Toff of the drive signal S1. To this end, an inverter 38 is used to supply the transistor 35 with a signal which corresponds to the inverted drive signal S1 and drives the transistor 35 into the on state during a low level of the drive signal S1.

Figure 8:
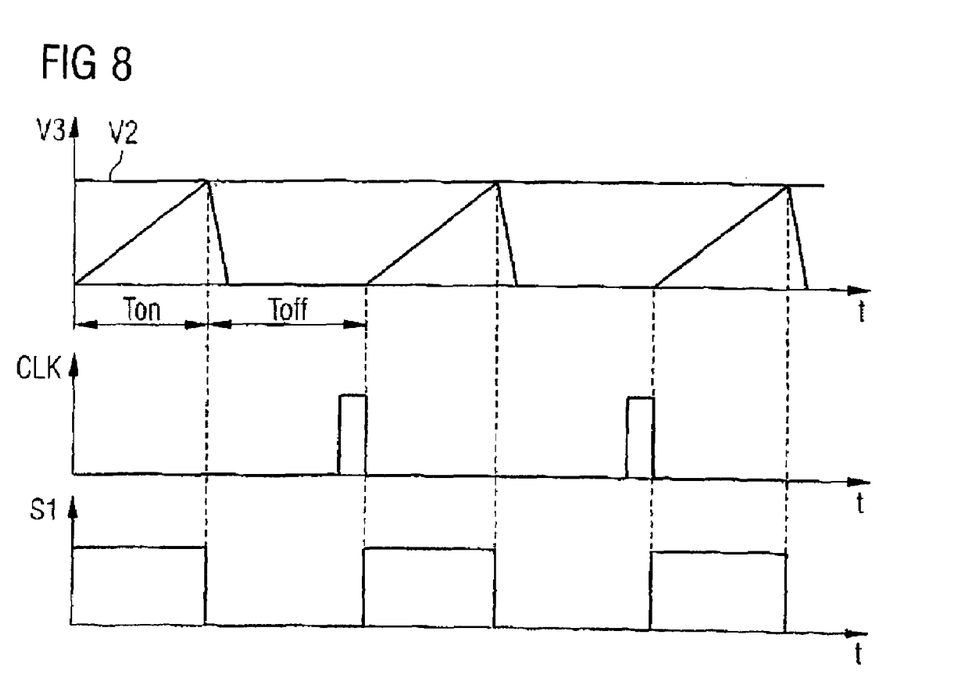
FIG. 8 shows temporal profiles of selected signals of the ramp signal generation circuit shown in FIG. 7 and of the comparator arrangement.

FIG. 8 shows the temporal profiles of the ramp signal V3, of the clock signal CLK and of the drive signal S1 for the circuit arrangement shown in FIG. 7. In contrast to the exemplary embodiments explained above, the rise of the ramp-shaped signal is respectively ended, in this exemplary embodiment, when the switched-on duration Ton ends since, in the manner explained above, the capacitor C3 is respectively discharged when the switched-on duration Ton ends.

For the sake of completeness, it shall be pointed out that a driver circuit 13 is usually connected downstream of the flip-flop 12, said driver circuit converting the level of the drive signal S1 which is applied to the output of the flip-flop to a level which is suitable for driving the switch, for example a power MOSFET, which are respectively used.

Figure 9:
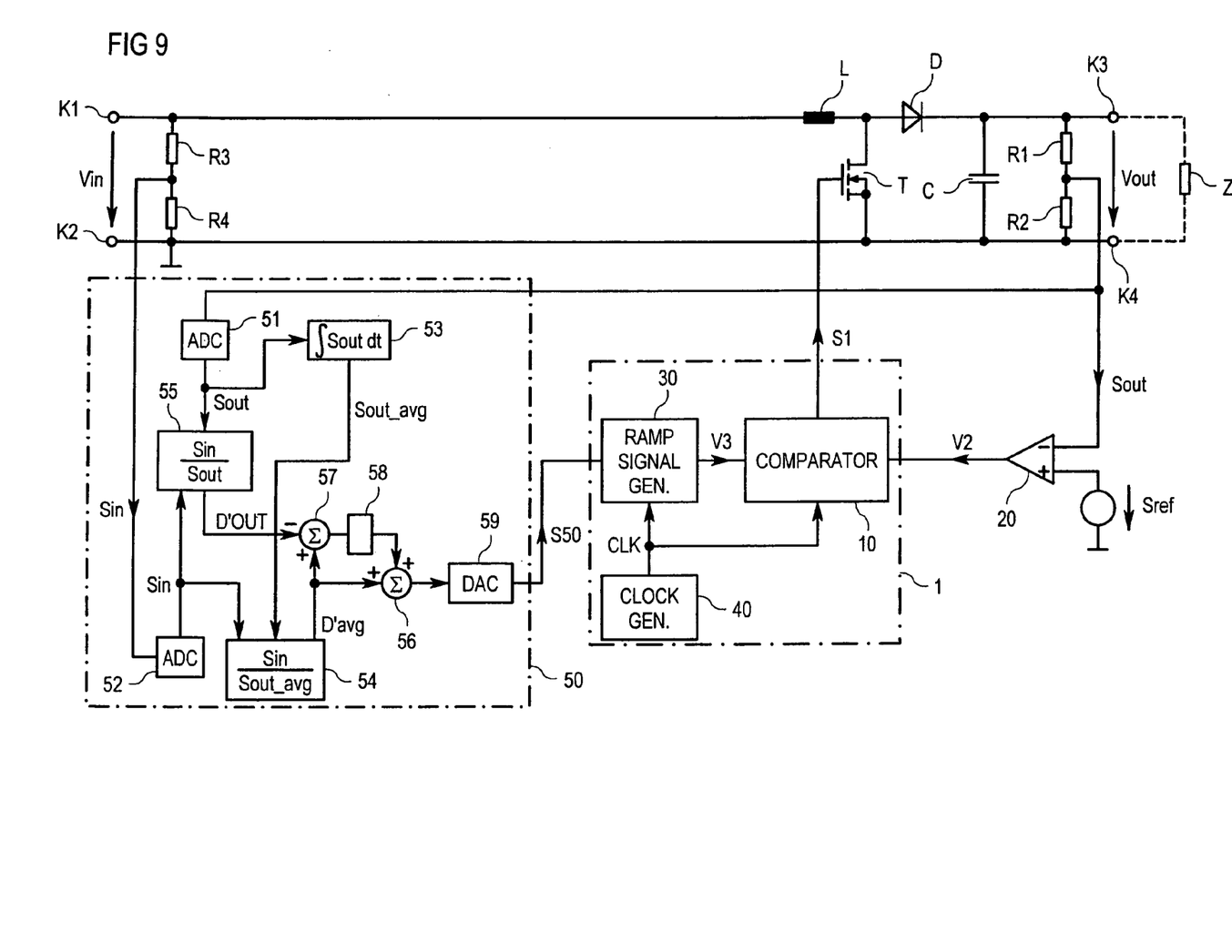
FIG. 9 shows an exemplary embodiment of an inventive step-up converter having a first feedback path which has a regulating arrangement and a second feedback path which has a sudden load change detector and is coupled to a drive circuit for generating a drive signal.

FIG. 9 shows another exemplary embodiment of a step-up converter. In a modification to the step-up converter shown in FIG. 1, the ramp signal generation circuit 30 is supplied, in this case, with a control signal S50 which is formed by a control signal generation circuit 50 from the input signal Sin, which is proportional to the input voltage Vin, and the output signal Sout, which is proportional to the output voltage Vout. The design and the method of operation of the ramp signal generation circuit 30 and of the comparator arrangement 10 correspond to the design and the method of operation of the previously explained ramp signal generation circuit 30 and the previously explained comparator arrangement 10.

In the example, the control signal generation circuit 50 is in the form of a digital circuit having a first digital/analog converter 51 for converting the output signal Sout into a digital output signal and a second digital/analog converter 52 for converting the input signal Sin into a digital input signal. In FIG. 9, the digital input and output signals Sin, Sout are denoted using reference symbols which correspond to those used for the analog input and output signals Sin, Sout supplied.

The digital output signal Sout is supplied to an integrator 53 which forms a mean value Sout_avg of the output signal Sout, the mean value preferably respectively being generated in the form of a sliding mean value for a prescribed period of time. This mean value is supplied, together with the digital input value Sin, to a first calculation unit 54 which determines a measure of a difference between the input signal Sin and the output signal Sout. To this end, the first calculation unit determines, for example, a first ratio value D'avg for which:

$$D'avg = Sin/Sout\_avg \quad (2).$$

A second calculation unit 55 uses the instantaneous value of the output signal Sout and the input signal Sin to determine a measure of the difference between the input signal and the output signal. To this end, the second calculation unit determines, for example, a second ratio value D'out for which:

$$D'out = Sin/Sout \quad (3).$$

The two ratio values D'avg and D'out are the same if the instantaneous value of the output signal Sout and thus the instantaneous value of the output voltage Vout correspond to the mean value. This is the case when the output voltage Vout has not changed when considered over the period of time over which the mean value is formed. These two ratio values D'avg and D'out are supplied to a subtractor 57 which forms the difference between these two values and provides a difference value D'err for which:

$$D'err = D'avg - D'out \quad (4).$$

This difference value D'err is zero if the output voltage Vout has not changed when considered over the averaging time. The difference value D'err is supplied, together with the first ratio value D'avg, via a filter 58, to an adder 56 whose output signal is supplied to a digital/analog converter 59 at whose output the control signal S50 is available.

The method of operation of the control signal generation circuit 50 is explained below:

If the output voltage Vout is constant for a long period of time, in particular for a period of time longer than the averaging period of the integrator 53, the quotient of the input signal Sin and the mean value Sout_avg of the output signal Sout is available at the output of the adder 56. This quotient is proportional to the input voltage Vin and inversely proportional to the desired value of the output voltage Vout if it is assumed that the mean value Sout_avg is proportional to the desired value of the output voltage.

In this case, the step-up converter behaves like the step-up converter which was explained with reference to the previous figures and in which a ramp signal having a ramp gradient that is proportional to the input voltage is generated.

If the output voltage Vout now suddenly changes as a result of a change in the load and assumes a value which differs from the mean value or the desired value, the two ratio values D'avg and D'out will differ from one another and the difference value D'err will assume a value that is not equal to zero. The control signal S50 is thereby changed using the adder in order to adapt the ramp gradient of the ramp signal generated by the ramp signal generation circuit. If the output voltage Vout falls below the previous mean value in this case, the first ratio value D'out will become greater than the second ratio value D'avg. The difference value D'err thus becomes negative, with the result that the control signal S50 is reduced. When the ramp signal generation circuit is designed as shown in FIG. 5, this results in a ramp signal V3 with gentler edges, thus resulting, when the regulating signal V2 is the same, in the switched-on duration of the switch T being extended in order to increase the power consumption and counteract this fall in the output voltage. Directly feeding back the output signal Sout to the signal generation circuit 50 thus, in the case of a sudden change in the output voltage Vout, immediately adapts the switched-on duration Ton, using the ramp signal V3, even before the regulating signal V2 can react to the change in the output voltage.

If the output voltage Vout suddenly increases, the difference value D'err will become positive, thus increasing the ramp gradient of the ramp signal V3 in order to reduce the switched-on duration and thus to reduce the power consumption. This immediately counteracts a further increase in the output voltage.

The filter 58 which is connected downstream of the subtractor is provided for reasons of stability and is in the form of a high-pass filter, for example, which, only after a sudden change in the output voltage Vout and thus in the difference signal D'err, provides the adder 56 with a signal which is not equal to zero.

The differentiator 57 with the calculation units 54, 55 (which are connected to the latter) and the filter 58 performs the function of a sudden load change detector which, after a sudden load change which leads to a sudden change in the output voltage, provides a signal which is not equal to zero in order to immediately change the ramp gradient of the ramp signal V3 (which was generated by the ramp signal generation circuit 30) even before the regulating signal V2 can be changed. This sudden load change detector is part of a second feedback path via which the output voltage Vout is fed back.

The invention claimed is:

1. A step-up converter comprising:
   input terminals configured to receive an input DC voltage and output terminals configured to provide an output DC voltage;
   step-up conversion circuitry coupled between the input terminals and the output terminals, the step-up conversion circuitry including a switching element;
   a first feedback path having a regulator arrangement configured to provide a regulating signal that is dependent on the output voltage;
   a drive circuit which is configured to provide a pulse-width-modulated drive signal for the switching element and is supplied with the regulating signal, wherein the drive circuit is configured to generate the drive signal in a manner that corresponds to the input voltage; and a second feedback path having a load change detection circuit configured to detect a sudden change in the output voltage and to operably provide a sudden load change signal which is dependent on such a detection at least indirectly to the drive circuit; and wherein the drive circuit is operably coupled to receive an input signal that is dependent on the input voltage, and wherein the drive circuit is further configured to generate the drive signal based on the input signal; and the drive circuit comprises a ramp signal generation circuit configured to receive the input signal and to generate a periodic ramp signal having a characteristic that is dependent on the input signal, and a comparator arrangement which generates the drive signal in a manner dependent on a comparison of the ramp signal with the regulating signal.

2. The step-up converter as claimed in claim 1, wherein the ramp signal generation circuit is configured to generate the periodic ramp signal to have a slope that increases as the input voltage increases.

3. The step-up converter as claimed in claim 1, wherein the ramp signal generation circuit comprises:
 a capacitive storage element coupled;
 a ramp signal generation circuit output coupled across the capacitive storage element;
 a controlled current source configured to provide a current which is dependent on the input signal; and
 a switching arrangement for changing a charge on the capacitive storage element with the current provided by the current source.

4. The step-up converter as claimed in claim 1, wherein the drive circuit is further configured to generate the drive signal in a manner that corresponds to the input voltage and to the sudden load change signal.

5. The step-up converter as claimed in claim 3, wherein the ramp signal generation circuit is configured to generate the periodic ramp signal to have a slope that increases as the input voltage increases and that corresponds to the sudden load change signal.

6. The step-up converter as claimed in claim 5, wherein the load change detector includes a filter.

\* \* \* \* \*